United States Patent [19]

Stromath et al.

[11] Patent Number: 4,986,495
[45] Date of Patent: Jan. 22, 1991

[54] COOLING STRUCTURE

[75] Inventors: David K. Stromath, Redondo Beach; Curtiss D. Wiler, Palos Verdes, both of Calif.

[73] Assignee: Rockwell International Corporation, El Segundo, Calif.

[21] Appl. No.: 207,072

[22] Filed: Jun. 15, 1988

[51] Int. Cl.$^5$ ............................ B64G 1/58; B64C 1/40
[52] U.S. Cl. ............................ 244/117 A; 244/158 A; 244/123
[58] Field of Search ................ 244/117 R, 117 A, 119, 244/121, 135 R, 158 A, 57, 123; 165/169, 41, 184

[56] References Cited

U.S. PATENT DOCUMENTS

| 2,762,419 | 9/1956 | Prewitt | 244/119 |
| 2,817,484 | 12/1957 | Stenzel | 244/119 |
| 3,126,718 | 3/1964 | Flamand | 244/121 |
| 3,321,159 | 5/1967 | Jackson | 244/135 R |
| 4,273,304 | 6/1981 | Frosch et al. | 244/117 A |
| 4,786,015 | 11/1988 | Niggemann | 244/117 A |

FOREIGN PATENT DOCUMENTS

| 839647 | 6/1960 | United Kingdom | 244/117 A |
| 844847 | 8/1960 | United Kingdom | 244/117 A |
| 1048872 | 11/1966 | United Kingdom | 244/117 A |

OTHER PUBLICATIONS

Niblock et al., "Four Space Shuttle Wing Leading Edge Concepts", Journ. Spacecraft, vol. 11, No. 5, May 1974, pp. 314–320.

Primary Examiner—Galen Barefoot
Attorney, Agent, or Firm—Charles T. Silberberg; Max Geldin

[57] ABSTRACT

A primary load bearing structure particularly adapted for hypersonic aerospace vehicles utilizing a cryogenic liquid fuel, and comprised of a plurality of rigid load bearing, fluid passageways or tubes connected together in the form of a panel structure. Such panel structure and the passageways or the tubes thereof form the outside surface of the aerospace vehicle and are also positioned adjacent to or integral with a wall of the cryogenic liquid fuel tank. During flight, cryogenic liquid fuel is passed through the tubes to provide cooling for the external surface of the vehicle. When the aerospace vehicle is on the ground, the load bearing tubes can be evacuated to provide insulation for the cryogenic liquid fuel tank to thus prevent formation of frost and liquid air on the outside surface of the tank, as well as on the external surface of the aerospace vehicle and prevent heat transfer to the tank. Passage of the cryogenic liquid fuel through the passageways or tubes of the panel structure for cooling the adjacent surface portions of the aerospace vehicle also preheats the cryogenic fuel for more efficient combustion.

8 Claims, 1 Drawing Sheet

U.S. Patent      Jan. 22, 1991      4,986,495
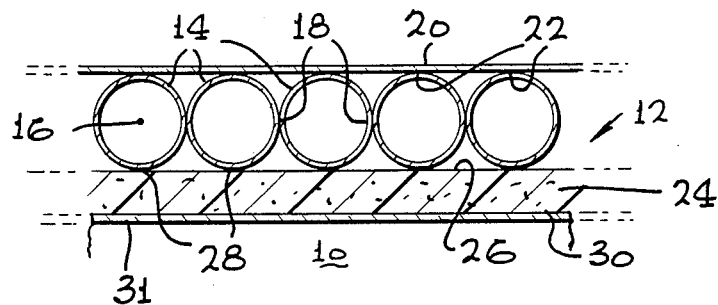
FIG. 1
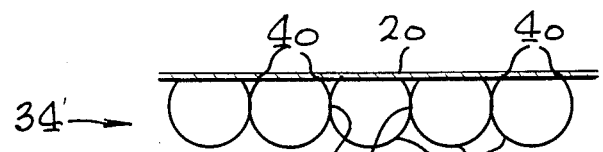
FIG. 2
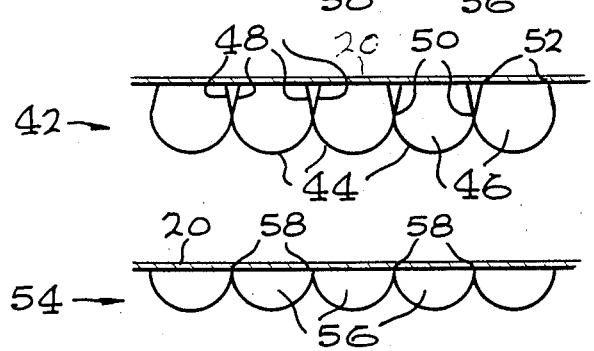
FIG. 3
FIG. 4
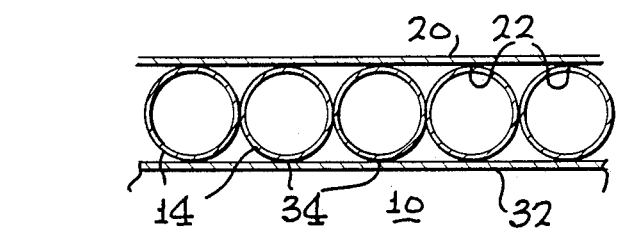
FIG. 1a
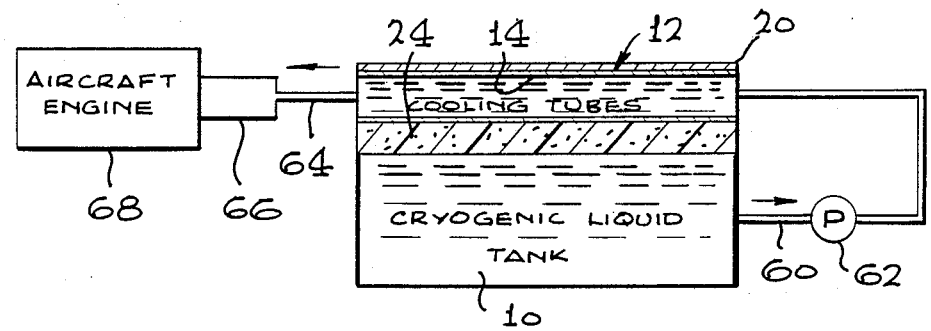
FIG. 5

COOLING STRUCTURE

BACKGROUND OF THE INVENTION

This invention relates to a system for cooling hypersonic aerospace vehicles subjected to high thermal loads and is particularly directed to the provision of a structure for cooling and insulation of such aerospace vehicles employing cryogenic fuels.

Various arrangements have been provided for cooling surface portions of aerospace vehicles, particularly hypersonic aerospace vehicles. In the design of thermal protection systems for aerospace vehicles, such system should not transfer excessive heat to the basic vehicle structure. should have low weight, and should produce low thermal stresses. Current thermal protection system concepts employ multitudes of ceramic tiles as reusable surface insulation to accommodate thermal expansion differences with the structure and multitudes of joints resulting in considerable undesirable weight. Such tiles have the further disadvantages of being weak, brittle and subject to surface cracking and being labor intensive, both for production and for maintenance.

Various thermal protection systems, and particularly systems for cooling surface portions of an aircraft, have been developed in the prior art to overcome these problems and to provide suitable cooling for the exterior surface portions of an aerospace vehicle. Thus, U.S. Pat. No. 4,344,591 is directed to a multiwall thermal protection system to replace the tile system of the prior art.

In another form of cooling system employed in the prior art, the fuel employed in the aircraft is circulated in heat exchange relation with external surface portions of the aircraft to cool such portions, prior to delivery of the fuel to the aircraft power plant. Thus, U.S. Pat. No. 3,015,461 discloses, in an airplane, a fuel transfer means from the fuel supply, including a heat exchanger section located in heat exchange relation to an exterior surface of the aircraft for circulation of liquid fuel therethrough, to effect surface cooling required by supersonic surface heating conditions. The increase of fuel temperature as the liquid fuel circulates through the heat transfer section prior to delivery of the fuel to a thrust augmentation system, such as an afterburner, adds to the effectiveness of the latter. In one modification of the arrangement of this patent, a heat transfer section is located in the wing adjacent an exterior surface portion of the airplane and formed of a plurality of passageways for the fuel. The interior of the wing functions as a fuel storage member for the fuel, usually in the form of a petroleum distillate fuel, such as those designated JP4 or JP5.

In the 3,015,461 patent, the means forming the heat exchange passages 44, 48 and 53 for the fuel, in FIGS. 5-7 of the patent, are not an integral part of the structural design of the airplane and do not form load bearing members. The skin of the airplane in effect forms a heat exchanger. The patent also does not address the problems presented where a liquefied gas at very low temperatures, such as liquid hydrogen, is employed as the fuel. Under these circumstances, one of these problems is that when the aircraft is standing on the runway, and if there is insufficient insulation, liquid air is formed on the skin of the vehicle or on the outside of the fuel tank, resulting in an extremely hazardous condition.

It is accordingly an object of the present invention to provide an improved heat exchange structure for cooling portions, particularly external portions, of an aircraft, such as a hypersonic aerospace vehicle, and wherein the heat exchange structure is a load bearing structure.

Another object of the invention is to provide a simple, durable load bearing cooling structure of the above type which can be readily fabricated and which is adapted for use with cryogenic fuels, such as liquid hydrogen.

A further object of the invention is the provision of an improved cooling and insulation system for aerospace vehicles, particularly supersonic aerospace vehicles, which is formed integral with an airframe component, such as the fuselage, wing or tail of the aerospace vehicle, for use with liquid cryogenic fuel, and which can be subjected to a vacuum when the vehicle is on a runway, to prevent hazardous formation of liquid air on the outer skin or other components of the vehicle and to minimize heat flow into the tank and its cryogenic fuel.

SUMMARY OF THE INVENTION

The above objects are achieved according to the invention by the provision of an integral primary structure comprised of a plurality of rigid, load bearing fluid passageways, e.g., metal or composite tubes, attached together in a panel and forming a component of the aircraft structure. Such panel provides a structural load path for passage of liquid fuel, particularly cryogenic liquid fuel, as a coolant for the external surface forming the skin of the aircraft during flight. In a preferred embodiment, such primary structure can be employed in conjunction with an integral fuel tank configuration so that the panel and tubes thereof are connected to and form both the walls of the tank and also the skin of the aerospace vehicle, to thereby provide insulation for the tank and cooling for the skin of the vehicle.

When the aerospace vehicle is on the ground or runway, the tubes of the integral panel structure can be evacuated to provide insulation for the cryogenic fuel tank to thus prevent formation of frost and liquid air on the outside of the tank, as well as on the skin of the aircraft. Passage of the cryogenic liquid fuel through the tubes of the panel structure for cooling the adjacent surface portions of the aerospace vehicle also preheats the cryogenic fuel for more efficient combustion.

Thus, the structure and its function in the present application differ markedly from that of the above U.S. Pat. No. 3,015,461 in that in the above patent, the means forming the cooling passages for the fuel is not an integral load bearing part of the structural design and also would apparently not withstand being subjected to a vacuum while the vehicle is on the ground, to form insulation which would otherwise be required to prevent heat transfer to the tank and liquid air formation, where the fuel is a cryogenic liquid, so that the vacuum in the tubes is itself the insulation for the fuel tank.

DESCRIPTION OF THE DRAWINGS

The invention will be more clearly understood by reference to the detailed description below taken in conjunction with the accompanying drawings wherein:

FIG. 1 is a cross-sectional view of one form of panel structure according to the invention comprised of a plurality of attached cylindrical tubes in conjunction with a cryogenic fuel tank of an aerospace vehicle;

FIG. 1a illustrates a structure similar to FIG. 1 but omitting the insulation member of FIG. 1;

FIG. 2 shows another embodiment of the panel structure of the invention comprised of a plurality of attached truncated tubes;

FIG. 3 illustrates another embodiment of panel structure according to the invention comprised of a plurality of attached semicircular tubes, each tube attached to convergently extending sidewalls;

FIG. 4 is yet another modification of a panel structure according to the invention comprised of attached semicircular tubes; and FIG. 5 is a schematic illustration of an aerospace system embodying the panel cooling and insulation structure of the invention.

DETAILED DESCRIPTION OF THE INVENTION AND PREFERRED EMBODIMENTS

Referring to FIG. 1 of the drawings, illustrating one form of integral load bearing panel structure according to the invention, the arrangement is comprised of a cryogenic fuel tank 10 mounted on an aerospace vehicle, the outer wall of which is comprised of a panel structure 12 formed of a plurality of cylindrical tubes 14 of substantially equal diameter, the axis 16 of each of such tubes lying in a common plane. The tubes 14 are connected together by any suitable means, such as by welding at 18 between the contacting peripheral surfaces of adjacent tubes.

An outer skin 20 of the aerospace vehicle is attached to the outer aligned peripheral surfaces of each of the tubes 14, as by welding at 22.

Alternatively, the panel and tubes can be formed in a single step using diffusion bonding and superplastic forming (SPF/DB) or similar processes, in which case the tubes will be other than circular in cross section. Hence, the term "tubes", as employed herein, is intended to denote broadly load bearing passageways of varying shapes.

Although not necessary, an optional insulation member or layer 24, e.g., comprised of a quartz fiber blanket, is attached by suitable means at its outer surface 26 to the inner aligned peripheral surfaces 28 of each of the tubes 14. In this embodiment, the inner surface 30 of the cryogenic insulation material 26 is connected by suitable means to a skin 31 which forms the internal surface of the liquid fuel, e.g., liquid hydrogen, tank 10.

Where the optional insulation member 26 is not employed, as illustrated in FIG. 1a, the skin or wall 32 of the cryogenic tank 10 can be attached directly to the inner aligned peripheral surfaces of the tubes, as by welding, at 34. In this preferred embodiment, the primary panel structure is employed in conjunction with an integral fuel tank so that the panel and tubes thereof are integral with and form both the wall 32 of the tank and also the skin 20 of the aerospace vehicle, thus providing insulation for tank 12 and cooling for the skin 20 of the vehicle.

The tubes 14 and the outer and inner skins 20, 31 and 32 can be formed of any suitable structural material, such as aluminum, titanium, or alloys thereof or composite materials, such as graphite-epoxy.

In use, cryogenic fuel, such as liquid hydrogen, contained in the tank 10 is circulated by suitable means through the tubes 14 during flight of the aerospace vehicle, to cool the structure, particularly the outer skin 20 of the structural panel, and to preheat the fuel for combustion in the power unit.

When the aircraft is on the ground or runway, the tubes 14 can be evacuated by suitable means to provide insulation for the cryogenic fuel tank 10 to prevent frost build-up and formation of liquid air, either on the outer skin 20 of the structural panel 12 or on the skin 31 or 32 forming the outer wall of the liquid fuel tank 10 in FIG. 1 or 1a, and to prevent heat transfer or heat flow into the tank.

Referring now to FIG. 2 of the drawing, there is shown a modified configuration of a panel structure 34' according to the invention, comprised of a plurality of aligned truncated cylindrical tubes 36, also having their axes in a common plane, welded together at 38 between contacting peripheral surfaces and with the outer edges 40 of each of such tubes connected as by welding to the outer skin 20.

Referring now to FIG. 3, there is shown another modified form of structural panel 42 according to the invention, comprised of a plurality of tubes 44 in planar alignment, each comprised of a semicylindrical portion 46, connected at the open end thereof to a pair of convergent walls 48. The aligned tubes 44 are connected together as by welding at 50 adjacent the open end of the semicylindrical tube portions 46, and the outer edges of the convergent walls 48 of the tubes are connected as by welding at 52 to the outer skin 20.

Referring now to FIG. 4, there is shown still another modified form of panel structure according to the invention, indicated at 54, and comprised of a plurality of contacting semicylindrical tubes 56 in planar alignment and connected at their outer contacting edges to outer skin 20 as by welding at 58.

Referring now to FIG. 5, there is schematically illustrated a system embodying the panel cooling and insulation structure, as illustrated in FIG. 1, for cooling the outer surface of the aerospace vehicle by the flow of cryogenic liquid fuel through the tubes 14 and preheating the cryogenic liquid fuel in the tubes prior to combustion thereof.

Thus, during normal operation, cryogenic liquid fuel is drawn from cryogenic tank 10 by a pump 62 through a supply line 60 and into the cylindrical tubes 14 of the load bearing panel structure 12 for effective cooling of the outer skin 20 of an aerospace vehicle, such as a supersonic aircraft Due to the large temperature difference between the cryogenic liquid fuel in the tubes 14 and the aircraft outer skin 20, heat flows from such outer skin to the fuel contained in the tubes and increases the fuel temperature as the cryogenic liquid fuel circulates through tubes 14. The resulting preheated cryogenic liquid fuel is then discharged from the tubes 14 and fed via supply line 64 to the combustion section 66 of the power generating unit or engine, indicated at 68. The means for combusting the fuel in the aircraft engine are generally well-known and are not illustrated.

Various modifications of the invention device will occur to those skilled in the art. Thus, for example, the tubes of the panel structure of the invention can encompass various design configurations, such as circular or elliptical, and various materials, as noted above. Further, instead of a substantially planar arrangement of the tubes, as illustrated in FIGS. 1-4 of the drawings, the tubes can be arranged in a non-planar configuration, such as a curved arrangement, e.g., wherein the outer skin 20 and the insulation member 24 and inner skin 31 of FIG. 1 can have a desired curvature, e.g., for accommodation in a wing structure having a curved outer skin.

From the foregoing, it is seen that the invention provides a primary structure comprising a plurality of load bearing tubes and particularly adapted for use in hypersonic aerospace vehicles utilizing a cryogenic liquid fuel, such structure also functioning to cool the outer skin of various portions of the vehicle and particularly employed in conjunction with the cryogenic liquid fuel tank, wherein liquid fuel, such as liquid hydrogen, is circulated through the tubes of the primary structure to suitably cool the outer skin of the vehicle, and for preheating the liquid fuel flowing through such tubes for subsequent combustion in the power unit. In the invention structure, the coolant tubes constitute the primary structural members so that the panel formed of such tubes is an integral load bearing structure. In the preferred embodiment, such tubes are connected to the outer skin of the vehicle and can also be connected to the wall of the liquid fuel tank.

When the aerospace vehicle is on the ground, since the tubes provide the primary stiffness of the structural panel, a vacuum can be drawn on the tubes to form the primary mode of insulation for the liquid fuel tank, and avoid frost formation and formation of liquid air on the external skin of the aerospace vehicle, or on the external wall of the liquid fuel tank. This avoids the need for substantial insulation which would otherwise be required to prevent particularly liquid air formation when the aerospace vehicle is standing on the runway.

Thus, in addition to functioning as a primary structure in an aerospace vehicle, the invention device has three additional important functions, namely, (1) to cool the outer skin of the aerospace vehicle or aircraft in flight by passage of cryogenic liquid fuel through the load bearing tubes thereof, (2) to warm such fuel in flight before it is introduced into the engine, and (3) to provide insulation to prevent warming of the fuel or formation of liquid air on the surfaces of the aerospace vehicle or on the liquid fuel tank when the aircraft is on the runway, by drawing a vacuum on the tubes.

Since various further modifications of the invention will occur to those skilled in the art, the invention is not to be taken as limited excent by the scope of the appended claims.

What is claimed is:

1. An aerospace vehicle comprising,
   a fuel tank containing a cryogenic liquid fuel,
   an external surface forming the skin of said vehicle,
   a primary load bearing structure disposed between said fuel tank and the external surface of said vehicle,
   said load bearing structure consisting of a panel structure formed of a plurality of rigid metal tubes of substantially cylindrical shape connected together in side-by-side relation at the contacting peripheral surfaces of adjacent tubes, said tubes extending lengthwise in said panel structure, the axis of each of said tubes being in a common plane,
   whereby cryogenic liquid fuel passing from said fuel tank and through said tubes during flight functions as a coolant for said external surface, and when said vehicle is on the ground, said tubes are constructed to be evacuated and said evacuated tubes providing insulation for said tank, to prevent formation of frost and liquid air on the outside of the tank and on the external surface of said vehicle, and to prevent heat transfer into the tank.

2. The aerospace vehicle as defined in claim 1, wherein said tubes are of substantially equal diameter, and wherein said tubes are also connected at their outer aligned peripheral surfaces to the external surface of said aerospace vehicle.

3. The aerospace vehicle as defined in claim 1, wherein said tubes are truncated cylindrical tubes and said tubes are also connected at their outer edges to the external surface of said aerospace vehicle.

4. The aerospace vehicle as defined in claim 1, each of said tubes comprised of a semicylindrical portion connected at the open end thereof to a pair of convergent walls, said tubes being connected together adjacent the open ends thereof, and the outer edges of the convergent walls of each of said tubes being connected to the external surface of said aerospace vehicle.

5. The aerospace vehicle as defined in claim 1, wherein each of said tubes is semicylindrical and connected at its outer edges to the external surface of said aerospace vehicle.

6. The aerospace vehicle as defined in claim 1, and including an additional insulation material disposed between said panel structure and said fuel tank.

7. The aerospace vehicle as defined in claim 1, said fuel tank having a wall, said tubes being integral with said fuel tank wall and with said external surface of said vehicle.

8. The aerospace vehicle as defined in claim 1, and including:
   means for feeding cryogenic liquid fuel from said fuel tank to said tubes,
   a power generating means, and
   means for circulating cryogenic liquid fuel from said tubes to said power generating means for combustion therein.

* * * * *